US012462729B2

(12) United States Patent
Bae

(10) Patent No.: US 12,462,729 B2
(45) Date of Patent: Nov. 4, 2025

(54) MUX-FREE ARCHITECTURE FOR PIXEL DATA BUS LATCHING IN FOVEATED DISPLAYS

(71) Applicant: Apple Inc., Cupertino, CA (US)

(72) Inventor: Young Don Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/407,193

(22) Filed: Jan. 8, 2024

(65) Prior Publication Data

US 2025/0225909 A1 Jul. 10, 2025

(51) Int. Cl.

*G09G 5/22* (2006.01)
*G09G 3/20* (2006.01)
*G09G 3/3275* (2016.01)
*G09G 3/36* (2006.01)

(52) U.S. Cl.

CPC ........... *G09G 3/2096* (2013.01); *G09G 5/227* (2013.01); *G09G 3/2092* (2013.01); *G09G 3/3275* (2013.01); *G09G 3/3688* (2013.01); *G09G 2310/0275* (2013.01); *G09G 2340/0407* (2013.01); *G09G 2354/00* (2013.01); *G09G 2370/20* (2013.01)

(58) Field of Classification Search

CPC ......... G09G 3/2096; G09G 2340/0407; G09G 2370/20; G09G 3/2092; G09G 3/3275; G09G 3/3688; G09G 5/227; G09G 2310/0275; G09G 2354/00; G06F 3/012–013

See application file for complete search history.

(56) References Cited

U.S. PATENT DOCUMENTS

| | | | |
|---|---|---|---|
| 7,423,624 | B2 | 9/2008 | Nose |
| 7,427,973 | B2 | 9/2008 | Itakura |
| 7,804,468 | B2 | 9/2010 | Park et al. |
| 10,475,370 | B2 | 11/2019 | Spitzer |

(Continued)

FOREIGN PATENT DOCUMENTS

| | | | |
|---|---|---|---|
| CN | 102360539 | A | 2/2012 |
| CN | 106205453 | A | 12/2016 |

(Continued)

OTHER PUBLICATIONS

International Search Report and Written Opinion for PCT Application No. PCT/US2025/010744 dated Jun. 14, 2025, 13 pgs.

*Primary Examiner* — Liliana Cerullo
(74) *Attorney, Agent, or Firm* — Fletcher Yoder, P.C.

(57) ABSTRACT

On a foveated electronic display, foveated image data may include a variety of groupings of pixels in different resolutions for different parts of the display. As such, different parts of the foveated image data are routed to different pixels of the electronic display. One way of routing data is to use multiplexers to select which image data is routed to which source latches of columns of pixels of the electronic display. Depending on the number of columns of the electronic display, however, the multiplexers may consume a significant portion of the die area while also consuming a significant amount of energy and reducing the field-of-view (FOV). Instead of using multiplexers to route foveated image data in the electronic display, groups of source latches of the electronic display may be hardwired to respective wires of a pixel data bus.

20 Claims, 17 Drawing Sheets

(56) References Cited

U.S. PATENT DOCUMENTS

| | | | | |
|---|---|---|---|---|
| 11,004,374 | B2 | 5/2021 | Kurokawa | |
| 11,335,227 | B2 * | 5/2022 | Seauve | G11C 19/28 |
| 11,355,043 | B1 * | 6/2022 | Choi | G09G 3/3233 |
| 11,430,391 | B2 | 8/2022 | Kwak | |
| 11,600,026 | B2 * | 3/2023 | Martin | G09G 5/363 |
| 11,705,037 | B1 * | 7/2023 | Hafiz | G09G 3/20<br>345/204 |
| 11,823,648 | B2 | 11/2023 | Knez et al. | |
| 2004/0164941 | A1 | 8/2004 | Kim et al. | |
| 2007/0035500 | A1 * | 2/2007 | Takeo | G09G 3/3688<br>345/98 |
| 2008/0117190 | A1 | 5/2008 | Chen et al. | |
| 2014/0247277 | A1 | 9/2014 | Guenter et al. | |
| 2016/0093260 | A1 | 3/2016 | Watsuda | |
| 2019/0355332 | A1 * | 11/2019 | Knez | G09G 5/391 |
| 2020/0312218 | A1 * | 10/2020 | Jeong | G09G 3/2092 |
| 2021/0174727 | A1 * | 6/2021 | Lee | G09G 3/2096 |
| 2021/0398491 | A1 * | 12/2021 | Kwak | G09G 3/3266 |
| 2023/0015967 | A1 * | 1/2023 | Sun | G06F 3/013 |
| 2023/0306914 | A1 * | 9/2023 | Lee | G09G 3/3233 |
| 2023/0410761 | A1 * | 12/2023 | Zong | H04N 13/398 |
| 2024/0046410 | A1 * | 2/2024 | Wicks | H04N 19/85 |
| 2024/0296778 | A1 * | 9/2024 | Gu | G09G 3/3225 |

FOREIGN PATENT DOCUMENTS

| | | |
|---|---|---|
| CN | 210378414 U | 4/2020 |
| CN | 114141199 A | 3/2022 |

* cited by examiner

MUX-FREE ARCHITECTURE FOR PIXEL DATA BUS LATCHING IN FOVEATED DISPLAYS

BACKGROUND

This disclosure relates to data bus architecture and, more specifically, data bus architecture in a multi-resolution display, such as a foveated display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including televisions, portable phones, computers, wearable devices, vehicle dashboards, virtual-reality glasses, and more—display images on an electronic display. To display an image, an electronic display may control light emission of its display pixels based at least in part on corresponding image data. In some scenarios, such as in virtual reality, mixed reality, and/or augmented reality, an image frame of the image data to be displayed may be blended from multiple sources. For example, graphics may be rendered in high definition and blended with a camera feed. Furthermore, the image data may be formatted in multiple resolutions, such as for a foveated display that displays multiple different resolutions of an image at different locations on the electronic display depending on a viewer's gaze or focal point on the display.

Foveated display architectures may use multiplexers to select which image data is routed to which columns of pixels of the electronic display. Depending on the number of columns of the electronic display, however, the multiplexers may consume a significant portion of the die area while also consuming a significant amount of energy. Moreover, sending image data across a pixel data bus to the source latches consumes energy, particularly as the number of columns of pixels of the electronic display increases.

SUMMARY

This disclosure relates to implementing a multiplexer-free architecture for data bus in foveated displays.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

Foveated electronic displays efficiently present image data based on characteristics of human vision—namely, that the human eye only sees in full resolution at a narrow point of focus and at much lower resolution in peripheral vision. Rather than generate full resolution image data for the entire electronic display, foveated image data may be generated that only includes the full resolution where the viewer is focused. In this way, the foveated image data may be generated that only includes the full resolution where the viewer is focused. In this way, the foveated image data that is displayed on a foveated electronic display may take up less memory and less bandwidth, but may look the same to the viewer, since the human eye cannot tell that the periphery has a lower resolution.

On a foveated electronic display, foveated image data may include a variety of groupings of pixels in different resolutions for different parts of the display. For example, a foveated region of the display where the viewer's eye is focused may display full resolution image data (e.g., one image data pixel for a 1×1 block of display pixels), whereas other peripheral parts of the electronic display may display lower resolution image data (e.g., one image data pixel for a 2×2 block of display pixels, one image data pixel for a 4×4 block of display pixels, and so on). Since the foveated region changes based on the movement of the viewer's eye, different areas of the electronic display present different resolutions at different times. As such, different parts of the foveated image data are routed to different pixels of the electronic display. One way of routing data is to use multiplexers to select which image data is routed to which source latches of columns of pixels of the electronic display. Depending on the number of columns of the electronic display, however, the multiplexers may consume a significant portion of the die area, leaves less area for the display active area meaning FOV (field of view) decreases while also consuming a significant amount of energy. Moreover, sending image data across a pixel data bus to the source latches consumes energy, particularly as the number of columns of pixels of the electronic display increases. Accordingly, in an embodiment it may be beneficial to reduce or eliminate multiplexers from a data bus and source latch architecture. Additionally, it may be beneficial to reduce the amount of energy consumed by the pixel data bus by gating slices of the pixel data bus to correspond to which source latches are being loaded.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
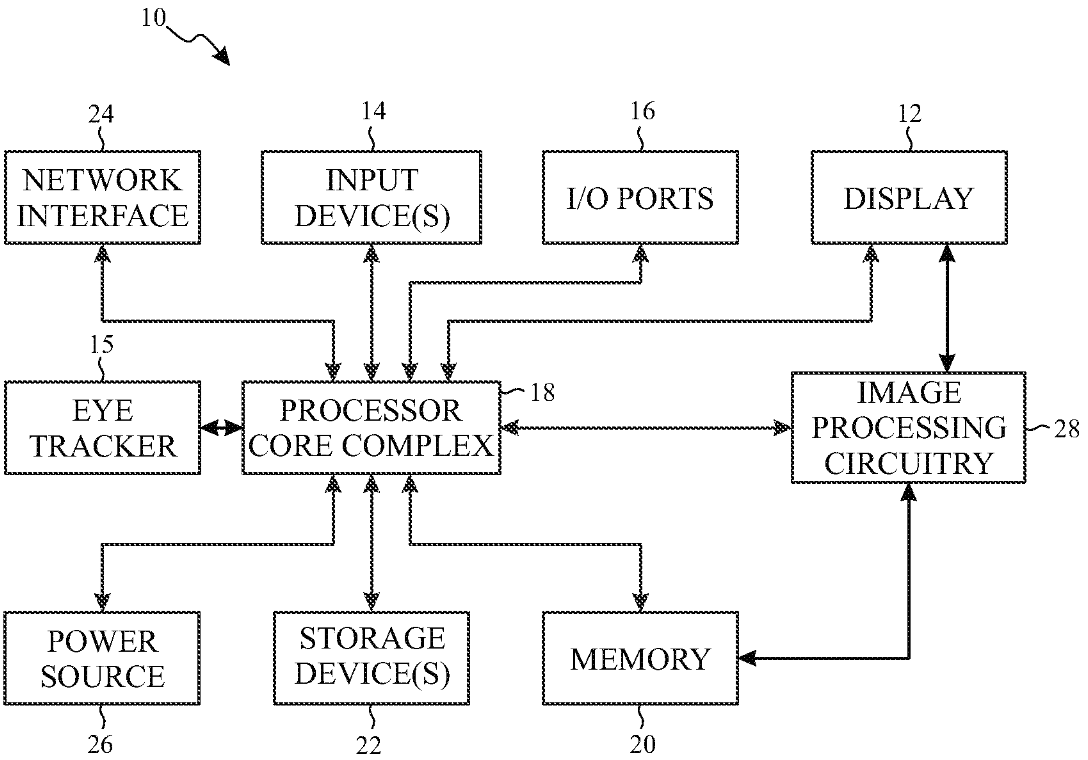
FIG. 1 is a schematic diagram of an electronic device that includes an electronic display, in accordance with an embodiment.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Foveated electronic displays efficiently present image data based on characteristics of human vision—namely, that the human eye only sees in full resolution at a narrow point of focus and at much lower resolution in peripheral vision. Rather than generate full resolution image data for the entire electronic display, foveated image data may be generated that only includes the full resolution where the viewer is focused. In this way, the foveated image data may be generated that only includes the full resolution where the viewer is focused. In this way, the foveated image data that is displayed on a foveated electronic display may take up less memory and less bandwidth, but may look the same to the viewer, since the human eye cannot tell that the periphery has a lower resolution.

On a foveated electronic display, foveated image data may include a variety of groupings of pixels in different resolutions for different parts of the display. For example, a foveated region of the display where the viewer's eye is focused may display full resolution image data (e.g., one image data pixel for a 1×1 block of display pixels), whereas other peripheral parts of the electronic display may display lower resolution image data (e.g., one image data pixel for a 2×2 block of display pixels, one image data pixel for a 4×4 block of display pixels, and so on). Since the foveated region changes based on the movement of the viewer's eye, different areas of the electronic display present different resolutions at different times. As such, different parts of the foveated image data are routed to different pixels of the electronic display. One way of routing data is to use multiplexers to select which image data is routed to which source latches of columns of pixels of the electronic display. Depending on the number of columns of the electronic display, however, the multiplexers may consume a significant portion of the die area while also consuming a significant amount of energy. Moreover, sending image data across a pixel data bus to the source latches consumes energy, particularly as the number of columns of pixels of the electronic display increases. The die area consumed by multiplexers will reduce the FOV (Field of View) can achieved with the same die size. FOV is one of the most critical part of the user experience especially for VR, MR, AR devices.

In an embodiment, instead of using multiplexers to route foveated image data in the electronic display, groups of source latches of the electronic display may be hardwired to respective wires of a pixel data bus. For example, a first group of four source latches may be connected to a first wire of the pixel data bus, a second group of four source latches may be connected to a second wire of the pixel data bus, and so on. The source latches of each group may be enabled or disabled individually (e.g., by control circuitry, by a state machine, and so on). Thus, image data provided on the first wire may be stored in selected source latches of the first group based on which of the source latches are enabled at a given time. For lower-resolution groupings (e.g., all four source latches receive the same single image data pixel), all of the source latches of a group may be enabled at once while one image data pixel is sent across a corresponding wire of the pixel data bus. For higher-resolution groupings, (e.g., source latch receives a different image data pixel), time multiplexing across the wire of the pixel data bus may be used. For example, at a first time, a first image data pixel may be sent across a wire of the pixel data bus while the first source latch of a group of source latches is enabled; at a second time, a second image data pixel may be sent across the wire of the pixel data bus while a second source latch of the group of source latches is enabled; and so forth. In this way, foveated image data may be effectively routed to the proper source latches without multiplexers.

In another embodiment, to reduce the amount of energy consumed by the pixel data bus, slices of the pixel data bus may be gated to correspond to which source latches are being loaded. For instance, a first set of source latches corresponding to a first slice of the pixel data bus may be loaded with data while downstream slices of the pixel data bus may be gated to save energy. A token signal passed along the pixel data bus may un-gate the slices over time as image data is passed along to further downstream slices. Thus, fewer slices of the pixel data bus may be active and consuming dynamic power at any point in time. To reduce the peak energy consumed by the pixel data bus, the pixel data bus may be divided into two parts that are loaded from opposite sides. Thus, the total number of gated slices may remain stable throughout the loading process.

With the foregoing in mind, FIG. 1 is an example electronic device 10 with an electronic display 12 having independently controlled color component illuminators (e.g., projectors, backlights). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, an eye tracker 15, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors such as reduced instruction set computing (RISC) processors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. For example, when a portable storage device is connected, the I/O port 16 may enable the processor core complex 18 to communicate data with the portable storage device. Moreover, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

Additionally, the electronic display 12 may be a display panel with one or more display pixels. For example, the electronic display 12 may include a self-emissive pixel array having an array of one or more of self-emissive pixels or liquid crystal pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as an LED (e.g., an OLED or a micro-LED). However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement). As used herein, a display pixel may refer to a collection of sub-pixels (e.g., red, green, and blue subpixels) or may refer to a single sub-pixel.

The eye tracker 15 may measure positions and movement of one or both eyes of someone viewing the electronic display 12 of the electronic device 10. For instance, the eye tracker 15 may include a camera that can record the movement of a viewer's eyes as the viewer looks at the electronic display 12. However, several different practices may be employed to track a viewer's eye movements. For example, different types of infrared/near infrared eye tracking techniques such as bright-pupil tracking and dark-pupil tracking may be used. In both of these types of eye tracking, infrared or near infrared light is reflected off of one or both of the eyes of the viewer to create corneal reflections. A vector between the center of the pupil of the eye and the corneal reflections may be used to determine a point on the electronic display 12 at which the viewer is looking. The processor core complex 18 may use the gaze angle(s) of the eyes of the viewer when generating/processing image data for display on the electronic display 12.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
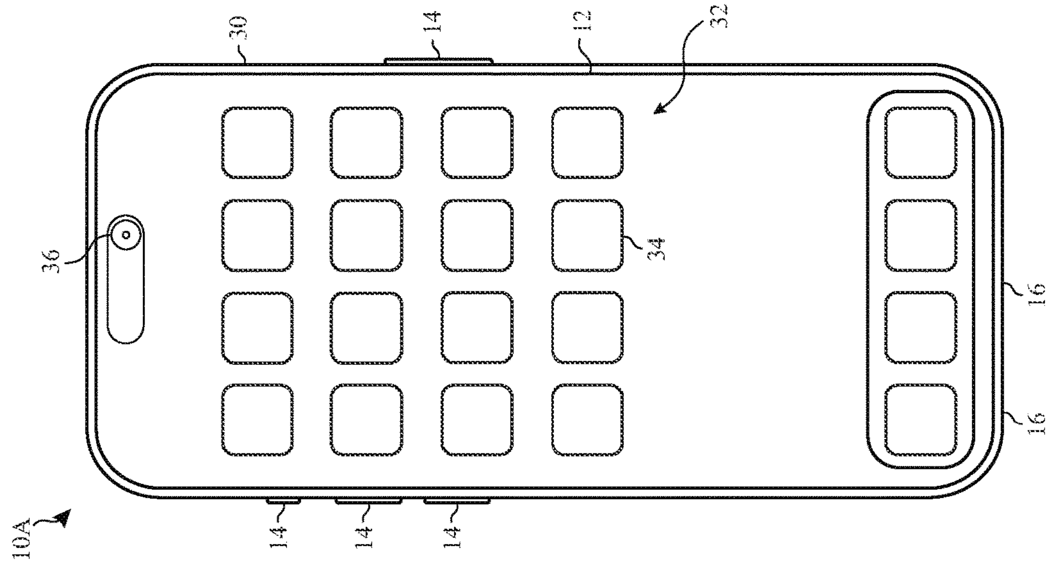
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
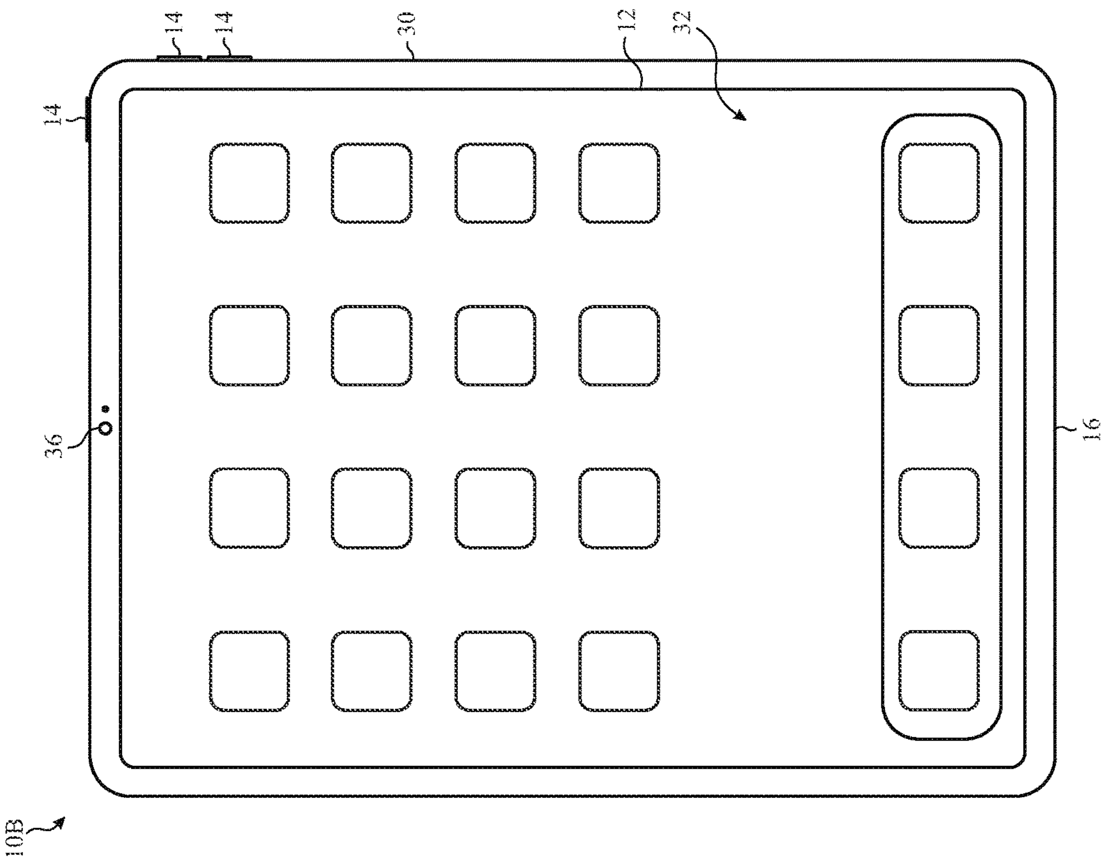
FIG. 3 is another example of the electronic device of FIG. 1 in the form of a tablet device, in accordance with an embodiment.
Figure 4:
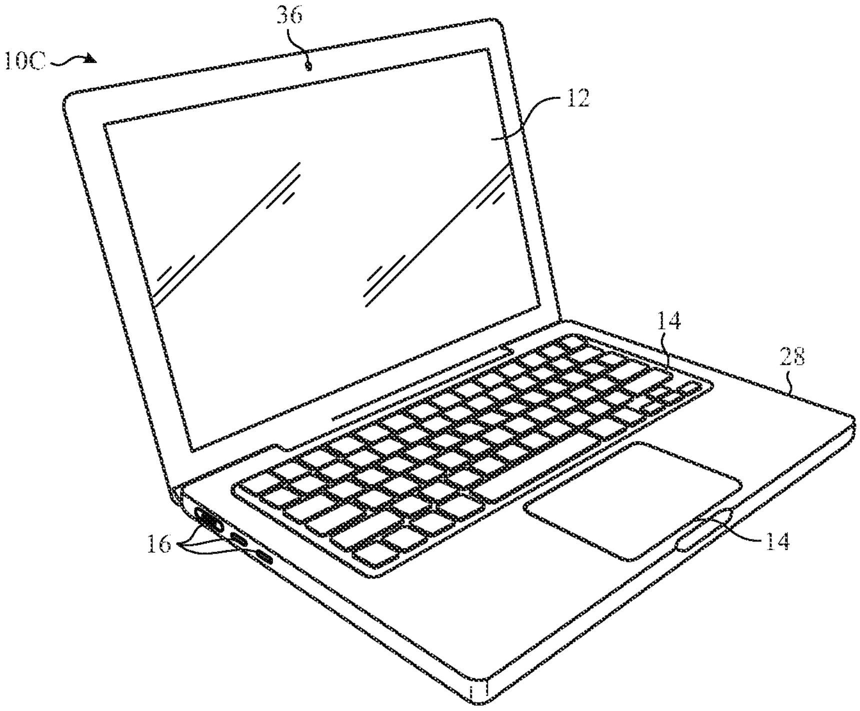
FIG. 4 is another example of the electronic device of FIG. 1 in the form of a computer, in accordance with an embodiment.
Figure 5:
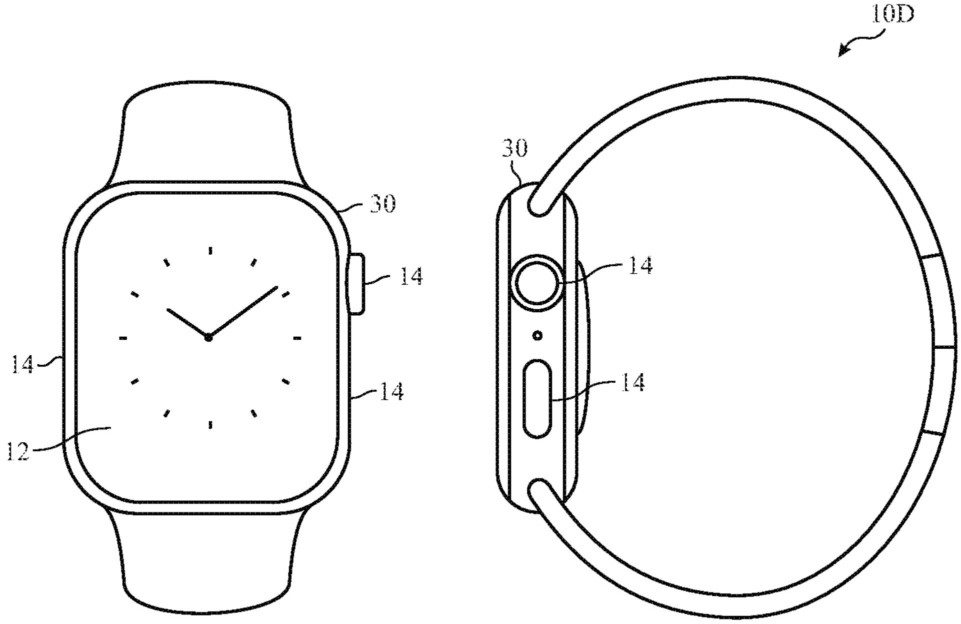
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
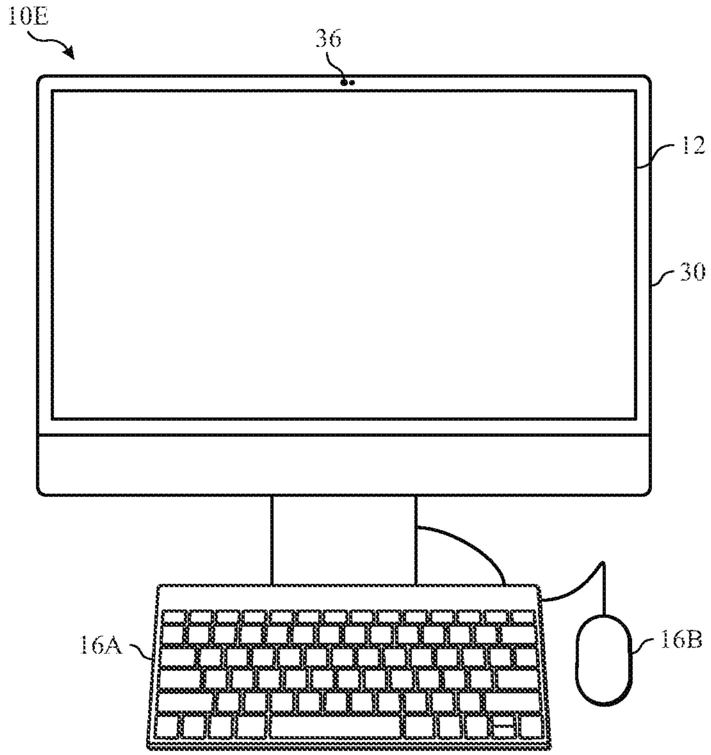
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
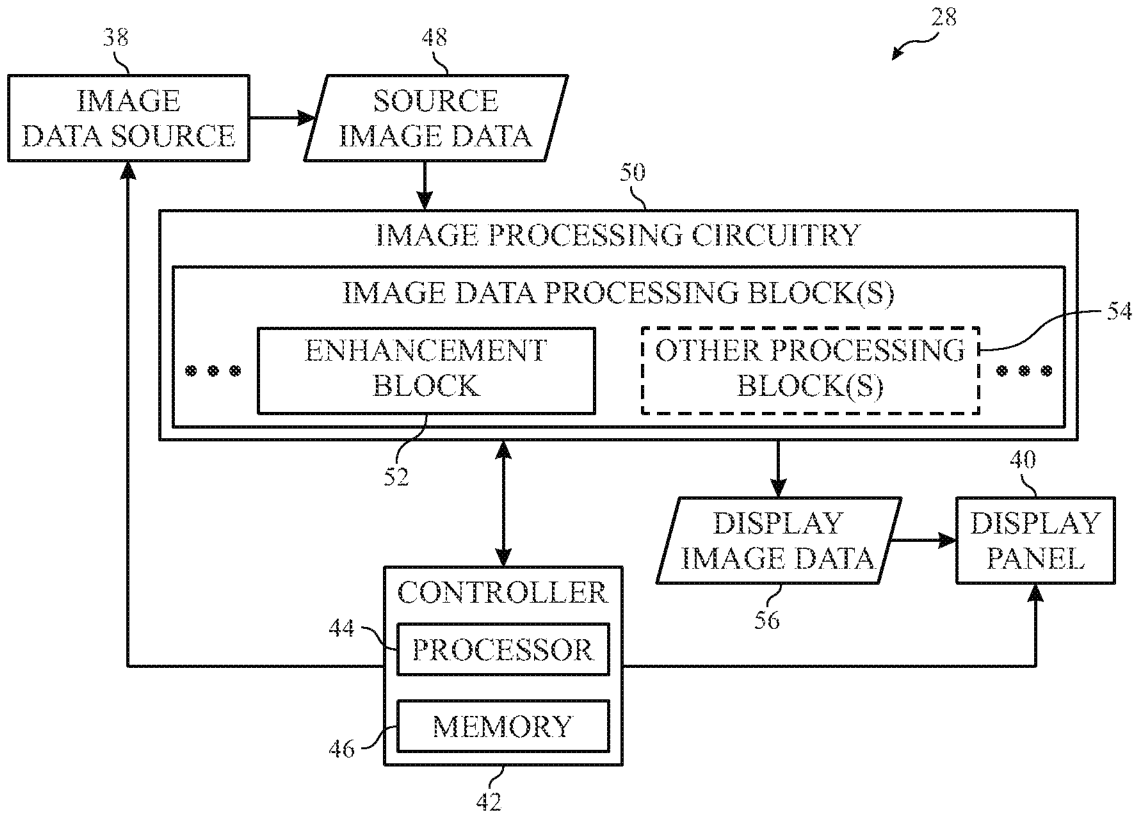
FIG. 7 is a schematic diagram of the image processing circuitry of FIG. 1, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display panel (e.g., OLED, LED, µLED, µOLED), transmissive display panel (e.g., a liquid crystal display (LCD)), a reflective technology display panel (e.g., DMD display), or any other suitable type of display panel 40. In some embodiments, the controller 42 may control operation of the image processing circuitry 28, the image data source 38, and/or the display panel 40. The controller 42 may include a controller processor 44 and/or controller memory 46. The controller processor 44 may be any suitable microprocessor, such as a general-purpose microprocessor such as a reduced instruction set computing (RISC) processor, an application specific integrated circuit (ASIC), a field programmable gate array (FPGA), or any combination thereof. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as an enhancement block 52. As should be appreciated, multiple other processing blocks 54 may also be incorporated into the image processing circuitry 28, such as a pixel contrast control (PCC) block, a burn-in compensation (BIC)/burn-in statistics (BIS) block, a color management block, a dither block, a blend block, a warp block, a scaling/rotation block, etc. before and/or after the enhancement block 52. The image data processing blocks 50 may receive and process source image data 48 and output display image data 56 in a format (e.g., digital format, image space, and/or resolution) interpretable by the display panel 40. For example, in the case of a foveated display (e.g., an electronic display 12 outputting multi-resolution image data), the image processing blocks 50 may output display image data 56 in the multi-resolution format.

Furthermore, the functions (e.g., operations) performed by the image processing circuitry 28 may be divided between various image data processing blocks 50, and, while the term "block" and/or "sub-block" is used herein, there may or may not be a logical or physical separation between the image data processing blocks 50 and/or sub-blocks thereof. After processing, the image processing circuitry 28 may output the display image data 56 to the display panel 40. Based at least in part on the display image data 56, the display panel 40 may apply electrical signals to the display pixels of the electronic display 12 to output desired luminances corresponding to the image.

Figure 8:
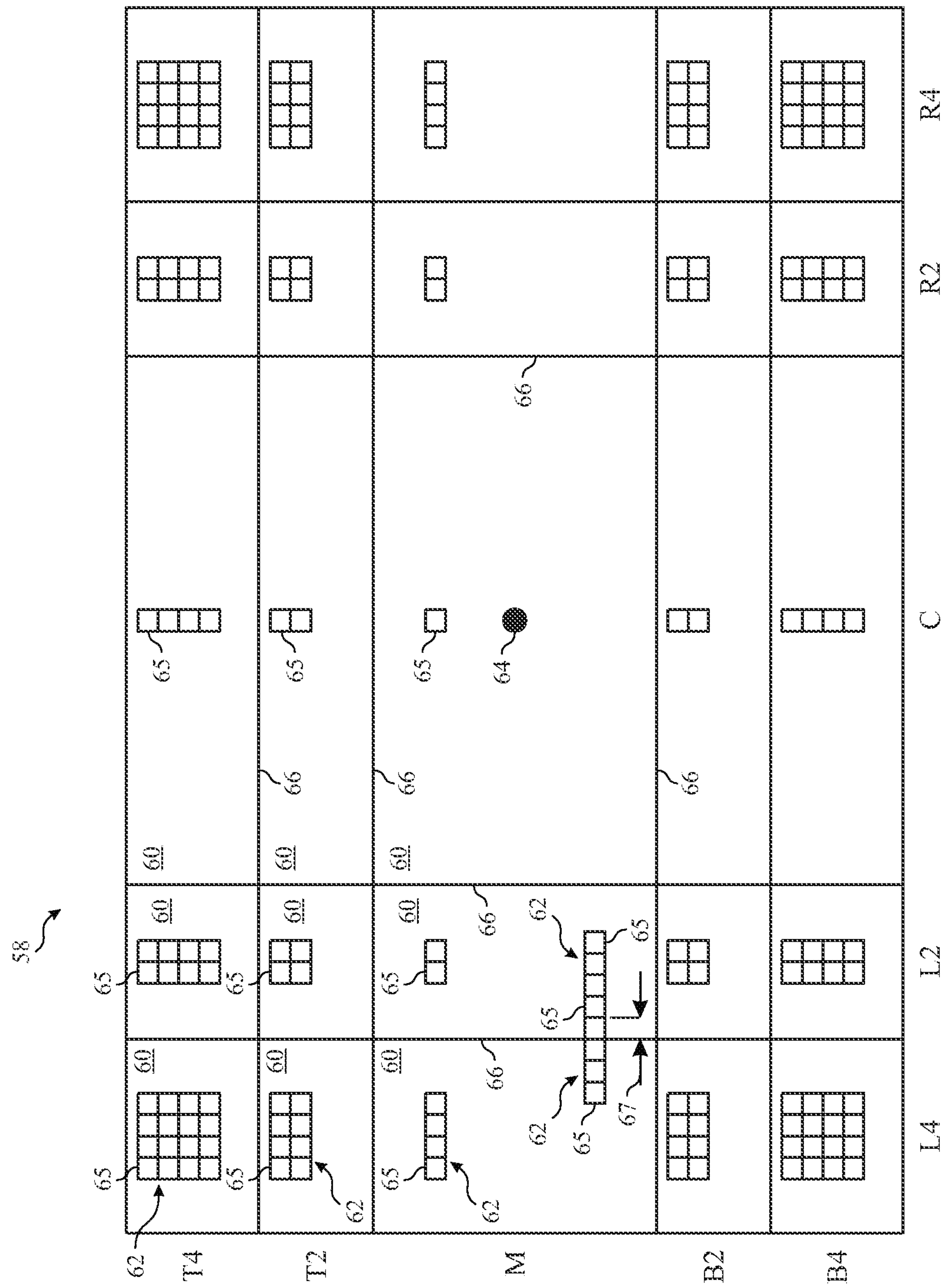
FIG. 8 is an example layout of multiple adjustable regions of pixel groupings of a foveated display, in accordance with an embodiment.

As discussed herein, in some scenarios, the display image data 56 may be output from the image processing circuitry 28 in a multi-resolution format to an electronic display 12 to be displayed in multiple resolutions. As should be appreciated, the boundaries of the regions of the multi-resolution format may be fixed or adjustable and may be based on the specifications of the electronic display 12 that receives the display image data 56 and/or based on a viewer's focal point, which may change on each image frame. To help illustrate, FIG. 8 is a foveated display 58 having multiple adjustable regions 60 of pixel groupings 62. In general, a foveated display 58 has a variable content resolution across the display panel 40 such that different portions of the display panel 40 are displayed at different resolutions depending on a focal point 64 (e.g., center of the viewer's gaze) of the user's gaze (e.g., determined by eye-tracking). By reducing the content resolution in certain portions of the display panel 40, image processing time and/or resource utilization may be reduced. While the human eye may have its best acuity at the focal point 64, further from the focal point 64, a viewer may not be able to distinguish between high and low resolutions. As such, higher content resolutions may be utilized in regions of the foveated display 58 near the focal point 64, while lesser content resolutions may be utilized further from the focal point 64. For example, if a viewer's focal point 64 is at the center of the foveated display 58, the portion of the foveated display 58 at the center may be set to have the highest content resolution (e.g., with 1×1 pixel grouping 62), and portions of the foveated display 58 further from the focal point 64 may have lower content resolutions with larger pixel groupings 62 (e.g., associated with anchor pixels 65, as discussed further below). In the example of FIG. 8, the focal point 64 is in the center of the foveated display 58 giving symmetrical adjustable regions 60. However, depending on the location of the focal point 64, the location of the boundaries 66 and the size of the adjustable regions 60 may vary.

In the depicted example, the foveated display 58 is divided into a set of 5×5 adjustable regions 60 according to their associated pixel groupings 62. In other words, five columns (e.g., L4, L2, C, R2, and R4) and five rows (e.g., T4, T2, M, B2, and B4) may define the adjustable regions 60. The center middle (C, M) adjustable region coincides with the focal point 64 of the viewer's gaze and may utilize the native resolution of the display panel 40 (e.g., 1×1 pixel grouping 62). Adjustable regions 60 in columns to the right of center (C), such as R2 and R4, have a reduced content resolution in the horizontal direction by a factor of two and four, respectively. Similarly, adjustable regions 60 in columns to the left of center, such as L2 and L4, have a reduced content resolution in the horizontal direction by a factor of two and four, respectively. Moreover, rows on top of the middle (M), such as T2 and T4, have a reduced content resolution in the vertical direction by a factor of two and four, respectively. Similarly, rows below the middle (M), such as B2 and B4, have a reduced content resolution in the vertical direction by a factor of two and four, respectively. As such, depending on the adjustable region 60, the content resolution may vary horizontally and/or vertically.

The pixel groupings 62 may be indicative of the set of display pixels that utilize the same image data in the reduced content resolutions. For example, while the adjustable region 60 at the focal point 64 may be populated by 1×1 pixel groupings 62, the adjustable region 60 in column LA and row M may be populated by 4×1 pixel groupings 62 such that individual pixel values, processed as corresponding to individual pixel locations in the reduced content resolution, are each sent to sets of four horizontal pixels of the display panel 40. Similarly, the adjustable region 60 in column LA and row T4 may be populated by 4×4 pixel groupings 62 such that pixel values are updated sixteen pixels at a time. As should be appreciated, while discussed herein as having reduced content resolutions by factors of two and four, any suitable content resolution or pixel groupings 62 may be used depending on implementation. Furthermore, while discussed herein as utilizing a 5×5 set of adjustable regions 60, any number of columns and rows may be utilized with additional or fewer content resolutions depending on implementation.

As the focal point 64 moves the boundaries 66 of the adjustable regions 60, and the sizes thereof, may also move. For example, if the focal point 64 were to be on the far upper right of the foveated display 58, the center middle (C, M) adjustable region 60, coinciding with the focal point 64, may be set to the far upper right of the foveated display 58. In such a scenario, the T2 and T4 rows and the R2 and R4 columns may have heights and widths of zero, respectively, and the remaining rows and columns may be expanded to encompass the foveated display 58. As such, the boundaries 66 of the adjustable regions 60 may be adjusted based on the focal point 64 to define the pixel groupings 62 for different portions of the foveated display 58.

As discussed herein, the pixel groupings 62 are blocks of pixels that receive the same image data as if the block of pixels was a single pixel in the reduced content resolution of the associated adjustable region 60. To track the pixel groupings 62, an anchor pixel 65 may be assigned for each pixel grouping 62 to denote a single pixel location that corresponds to the pixel grouping 62. For example, the anchor pixel 65 may be the top left pixel in each pixel grouping 62. The anchor pixels 65 of adjacent pixel groupings 62 within the same adjustable region 60 may be separated by the size of the pixel groupings 62 in the appropriate direction. Furthermore, in some scenarios, pixel groupings 62 may cross one or more boundaries 66. For example, an anchor pixel 65 may be in one adjustable region 60, but the remaining pixels of the pixel grouping 62 may extend into another adjustable region 60. As such, in some embodiments, an offset 67 may be set for each column and/or row to define a starting position for anchor pixels 65 of the pixel groupings 62 of the associated adjustable region 60 relative to the boundary 66 that marks the beginning (e.g., left or top side) of the adjustable region 60. For example, an anchor pixel 65 at a boundary 66 (e.g., corresponding to a pixel grouping 62 that abuts the left and/or upper boundary 66 of an adjustable region 60) may have an offset 67 of zero, while an anchor pixel 65 that is one pixel removed from the boundary 66 (e.g., one pixel to the right of or below the boundary 66) may have an offset 67 of one in the corresponding direction. As should be appreciated, while the top left pixel is exampled herein as an anchor pixel 65 and the top and left boundaries 66 are defined as the starting boundaries (e.g., in accordance with raster scan), any pixel location of the pixel grouping 62 may be used as the representative pixel location and any suitable directions may be used for boundaries 66, depending on implementation (e.g., read order).

I. Multiplexer-Free Architecture for Data Bus Latching

Figure 9:
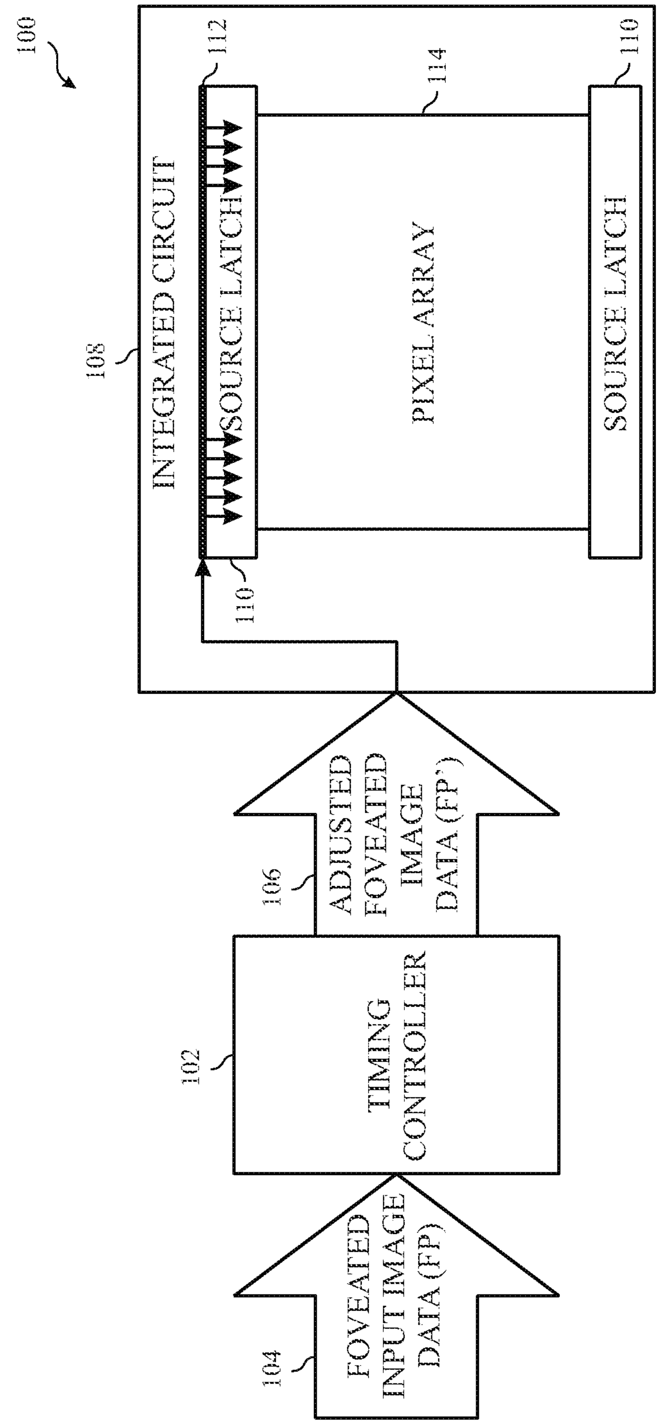
FIG. 9 is a block diagram of a system for adjusting foveated image data via a timing controller and providing the adjusted foveated image data to a pixel array via a data bus and source latches, in accordance with an embodiment.

FIG. 9 is a block diagram of a system 100 for providing foveated image data to a pixel array, according to an embodiment of the present disclosure. The system 100 may be a display module, and includes a timing controller 102 that receives foveated input image data 104 (e.g., from a system-on-chip (SoC)) and may manipulate and convert the format of the foveated input image data 104 to generate the adjusted foveated image data 106. The timing controller may output the adjusted foveated image data 106 to an integrated circuit 108. The integrated circuit 108 may include source latches 110, a data bus 112, and a pixel array 114. The data bus 112 is configured to provide the adjusted foveated image data 106 to the source latch 110. As will be discussed in greater detail below, the data bus 112 includes multiple lines, and the source latch 110 includes multiple registers coupled directly to lines of the data bus 112. The adjusted foveated image data 106 may be provided to the registers of the source latch 110 via the data bus 112.

Figure 10:
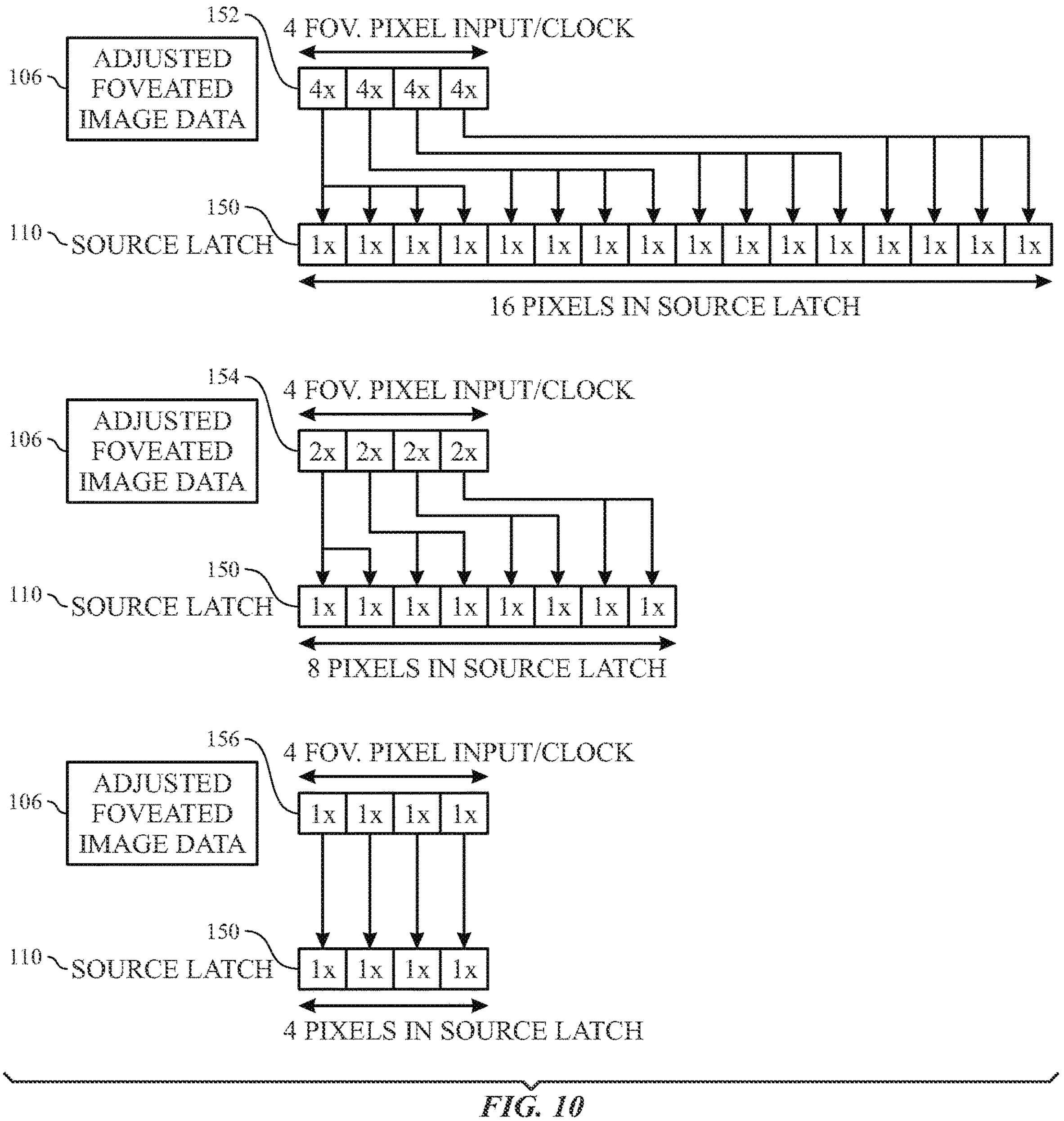
FIG. 10 illustrates providing foveated input pixels to registers of a source latch, in accordance with an embodiment.

FIG. 10 illustrates providing foveated input pixels to registers 150 of a source latch 110. The foveated input pixels may include the adjusted foveated image data 106. For example, a group of four 4× foveated input pixels 152 may be each provided to a block of four respective registers 150, such that the group of four 4× foveated input pixels 152 may provide image data to a total of 16 registers 150. As another example, a group of four 2× foveated input pixels 154 may each be provided to a block of two respective registers 150, such that the group of four 2× foveated input pixels 154 may provide image data to a total of eight registers 150. Because each of the four 2× foveated input pixels 154 provide image data to two registers, the display resolution (e.g., foveation resolution) associated with each foveated input pixel of the group of four 2× foveated input pixels 154 may be twice as high as the display resolution associated with the group of four 4× foveated input pixels 152.

As yet another example, a group of four 1× foveated input pixels 156 may each be provided to individual respective registers 150, such that the group of four 1× foveated input pixels 156 may provide image data to a total of four registers 150. Because each of the four 1× foveated input pixels 156 provide image data to a single register 150, the display resolution (e.g., foveation resolution) associated with each foveated input pixel of the group of four 1× foveated input pixels 156 may be twice as high as the display resolution associated with the group of four 2× foveated input pixels 154, and four times greater than the display resolution associated with the group of four 4× foveated input pixels 152.

To provide a multiplexer-free architecture, a foveation boundary may be aligned with a particular pixel group. That is, a group of pixels (e.g., a slice of the electronic display 12) may all have a constant foveation ratio. For example, if a slice includes 2× foveation pixels (e.g., foveation pixels with a 2× resolution), all foveation pixels in that slice may be 2×. If a 4× foveation pixel is included in a 2× slice, the 4× foveation pixel may be converted to two 2× foveation pixels to ensure that all foveation pixels in the given slice have a constant foveation ratio.

Figure 11:
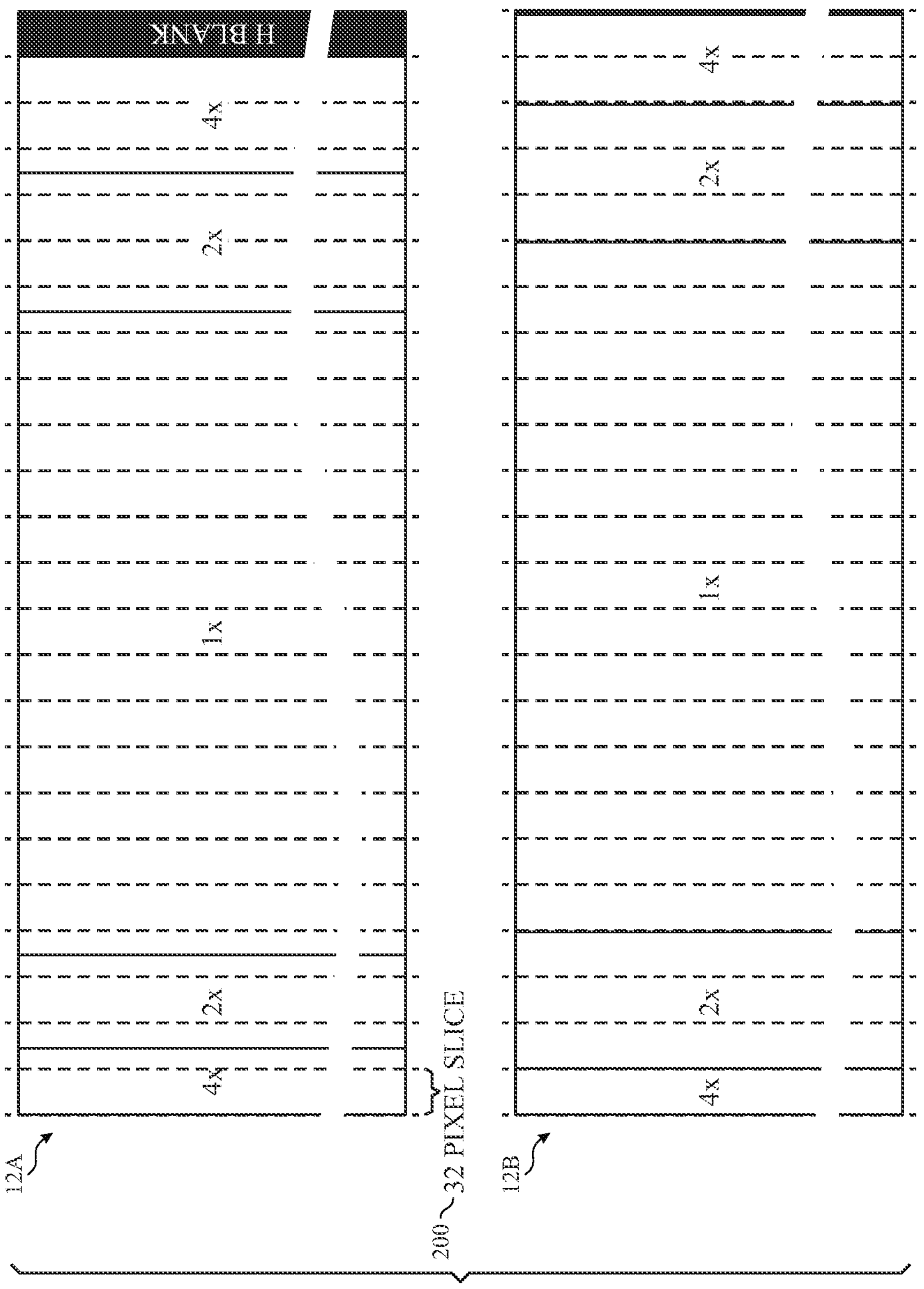
FIG. 11 illustrates an electronic display with unadjusted foveated image data (e.g., the foveated image data) and an electronic display having the adjusted foveated image data, in accordance with an embodiment.

The timing controller 102 may adjust the foveated input image data 104 to the adjusted foveated image data 106 to provide the constant foveation ratio for the slice of the electronic display 12, as will be described in greater detail below. FIG. 11 illustrates an electronic display 12A with unadjusted foveated image data (e.g., the foveated image data 104) and an electronic display 12B having the adjusted foveated image data 106, according to an embodiment of the present disclosure. As may be observed from the electronic display 12A, some slices are between foveation ratios, such that some slices may include 4× foveated pixels and 2× foveated pixels and some slices may include 2× foveated pixels and 1× foveated pixels, which may negatively impact the vertical field of view (VFOV) of the electronic display 12A. However, the electronic display 12B includes slices that all have a constant foveation ratio. It may be appreciated that the electronic display 12B may result in an improved vertical field of view, which may improve user experience.

Figure 12:
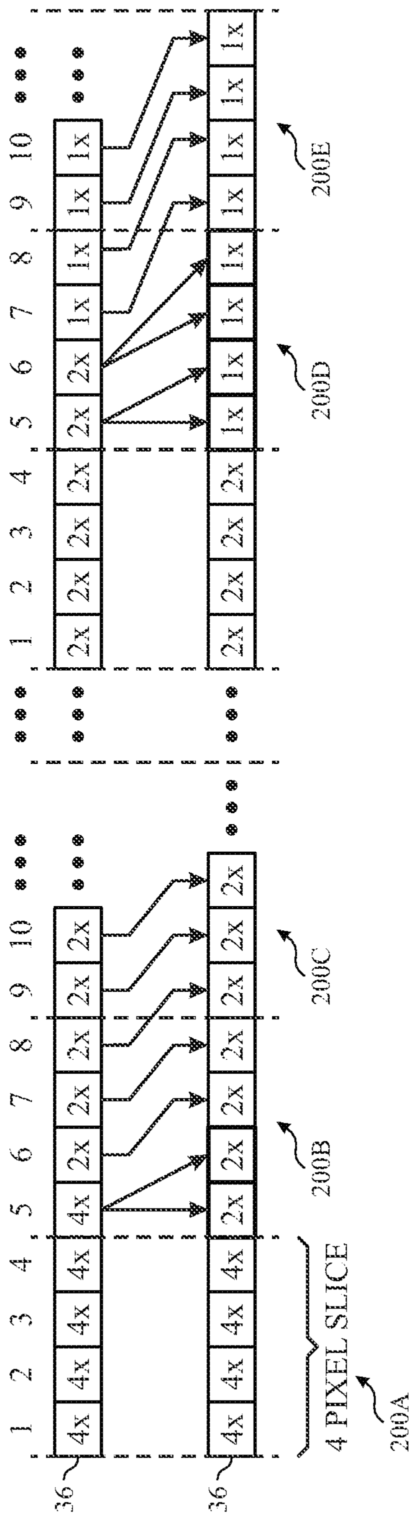
FIG. 12 illustrates the foveated image data manipulation performed by the timing controller of FIG. 9, in accordance with an embodiment.

FIG. 12 illustrates the foveated image data manipulation performed by the timing controller 102, according to an embodiment of the present disclosure. As may be observed, the foveated image data 104 in slice 200A includes all 4× pixels, and thus there is no pixel manipulation by the timing controller 102. In slice 200B, however, the first pixel of the foveated image data 104 includes a 4× pixel while the remaining pixels in the slice 200B include 2× pixels. The timing controller 102 converts all pixels in the slice up into the highest pixel resolution present in the slice. Consequently, the 4× pixel in the slice 200B will be converted up into two 2× pixels (the highest resolution in the slice 200B). Because one foveated image data pixel has been converted into two foveated image data pixels of higher resolution, the following 2× pixels will be shifted over one space to accommodate the additional 2× pixel. As a result, the last 2× pixel of the foveated image data 104 may be shifted to the slice 200C of the adjusted foveated image data 106. Similarly the two 2× pixels in the foveated image data 104 in slice 200D may be upconverted into two 1× pixels each, to accommodate the pixels having the highest resolution. Consequently, the two 1× pixels in the foveated image data 104 may be shifted over into slice 200E to accommodate the additional two 1× pixels in the slice 200D. Briefly returning to FIG. 11, it should be noted that shifting does not overuse the space of the electronic display 12 due to the excess headroom granted by the horizontal blanking period 201.

Figure 13:
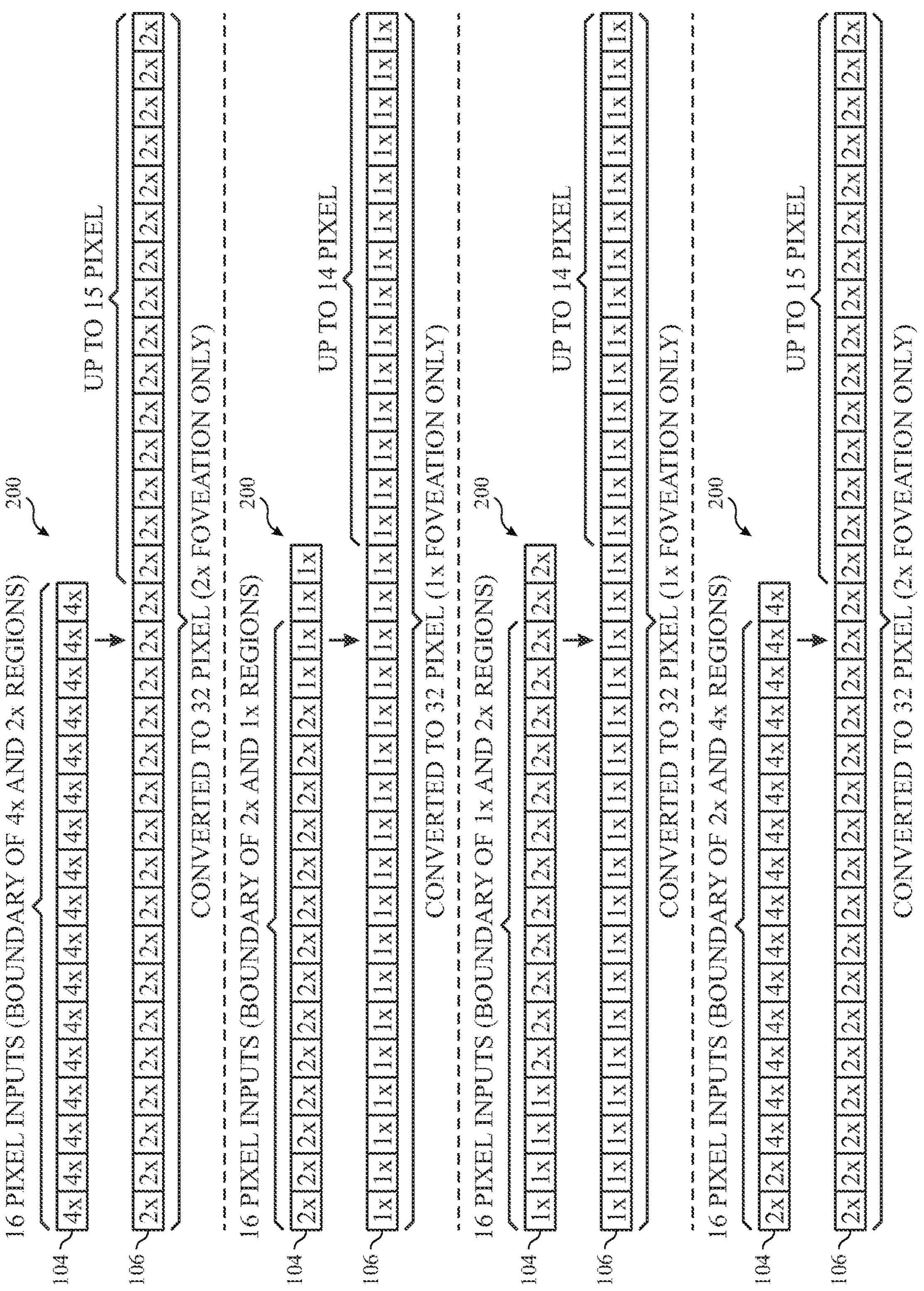
FIG. 13 illustrates foveated image data in a 16-pixel slice, in accordance with an embodiment.

It should be noted that a slice may be of any size or length, and the adjusted foveated image data may be converted to any appropriate length. FIG. 13 illustrates foveated image data 104 in a 16-pixel slice, according to an embodiment of the present disclosure. In the first example, the foveated image data 104 includes both 4× and 2× pixels, and thus the adjusted foveated image data 106 supplied to the data bus 112 may be converted (e.g., by the timing controller 102) to a constant foveation ratio of 2×, such that all pixels in the adjusted foveated image data 106 are 2× pixels. In the next example, the foveated image data 104 includes both 2× and 1× pixels, and thus the adjusted foveated image data 106 may be converted by the timing controller 102 to a constant foveation ratio of 1×, such that all pixels in the adjusted foveated image data 106 supplied to the data bus 112 include 1× pixels. In the next example, the foveated image data 104 includes 1× and 2× pixels, and thus the adjusted foveated image data 106 supplied to the data bus 112 include 1× pixels. And in the last example, the foveated image data 104 includes both 2× and 4× pixels, and thus the adjusted foveated image data 106 may be converted by the timing controller 102 to a constant foveation ratio of 2×, such that all pixels in the adjusted foveated image data 106 supplied to the data bus 112 include 2× pixels. It should be noted that the slices may include a greater number of pixels, such as 32 pixels, 64 pixels, 128 pixels, or any other appropriate number of pixels. Converting the foveated image data 104 to the adjusted foveated image data 106 having a constant foveation ratio may enable multiplexer-free routing architecture, such as the embodiments to be discussed with respect to FIGS. 14, 15, and 16 below.

As previously mentioned, since a foveated region changes based on the movement of the viewer's eye, different areas of the electronic display 12 present different resolutions (e.g., 1×, 2×, 4×) at different times. As such, different parts of the foveated image data are routed to different pixels of the electronic display. One way of routing data is to use multiplexers to select which image data is routed to which source latches of columns of pixels of the electronic display 12. Depending on the number of columns of the electronic display 12, however, the multiplexers may consume a significant portion of the die area while also consuming a significant amount of energy. Moreover, sending image data across the data bus 112 to the source latches 110 consumes energy, particularly as the number of columns of pixels of the electronic display 12 increases. Instead of using multiplexers to route foveated image data in the electronic display 12, groups of registers 150 of the source latches 110 of the electronic display 12 may be hardwired to respective wires of the data bus 112.

Figure 14:
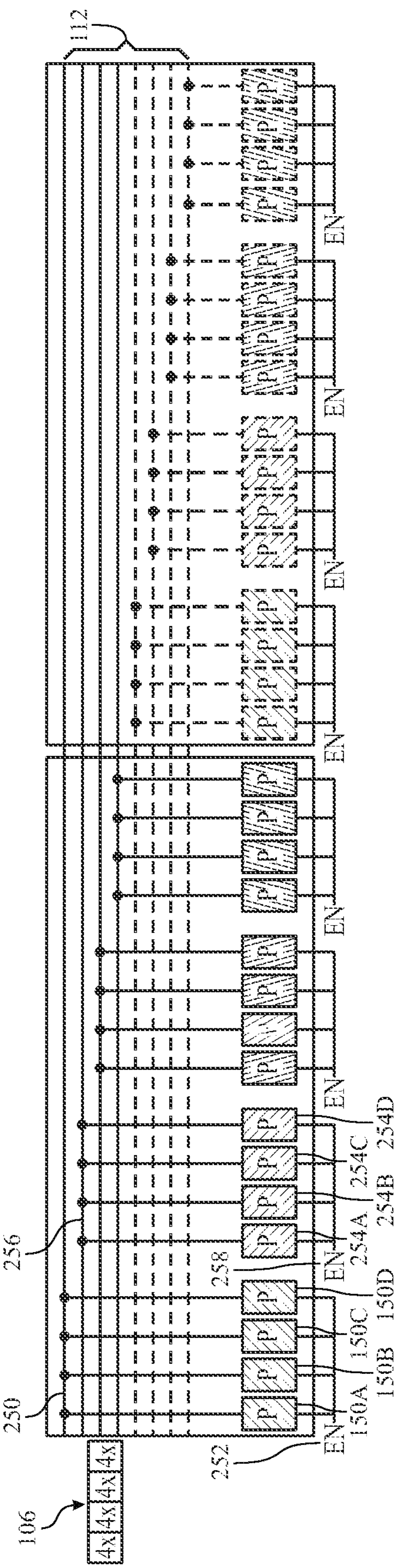
FIG. 14 illustrates a multiplexer-free architecture for data bus latching in a foveated display including multiple registers coupled directly to respective lines of the data bus, in accordance with an embodiment.

With this in mind, FIG. 14 illustrates a multiplexer-free architecture for data bus latching in a foveated display including multiple registers 150 coupled directly to respective lines of the data bus 112, according to embodiments of the present disclosure. FIG. 14 illustrates the data bus 112 receiving adjusted foveated image data 106 and passing the adjusted foveated image data pixels 106 to a first group of registers 150A, 150B, 150C, and 150D (collectively, the registers 150) coupled to a first wire 250 of the data bus 112. The first group of registers 150 may each be configured to receive an enable signal 252 configured to turn the registers 150 on or off. The enable signal may be transmitted via control circuitry, a state machine, and so on. If the enable signal 252 is high, the registers 150 may be turned on and may receive the adjusted foveated image data 106, which may then be passed from the registers 150 to display pixels to display image content on the electronic display 12. A second group of registers 254A, 254B, 254C, and 254D (collectively, the registers 254) may be coupled to a second wire 256 of the data bus 112. The second group of registers 254 may each be configured to receive an enable signal 258 configured to turn the registers 254 on or off. The enable signal 258 may be transmitted via control circuitry, a state machine, and so on. If the enable signal 258 is high, the registers 254 may be turned on and may receive the adjusted foveated image data 106, which may then be passed from the registers 254 to display pixels to display image content on the electronic display 12.

As will be discussed in greater detail below, all four registers 150A, 150B, 150C, and 150D (or 254A, 254B, 254C, and 254D) may be turned on, such that all four pixels of the foveated image data 106 may be provided to four display pixels associated with the four registers 150A, 150B, 150C, and 150D (or the display pixels associated with the registers 254A, 25B, 254C, and 254D). However, in some instances, one or more of the enable signals may be low, the registers corresponding to the low enable signal may not receive the adjusted foveated image data 106, and thus only a portion of the display pixels coupled to the registers 150 (or 254) may receive the adjusted foveated image data 106.

Figure 15:
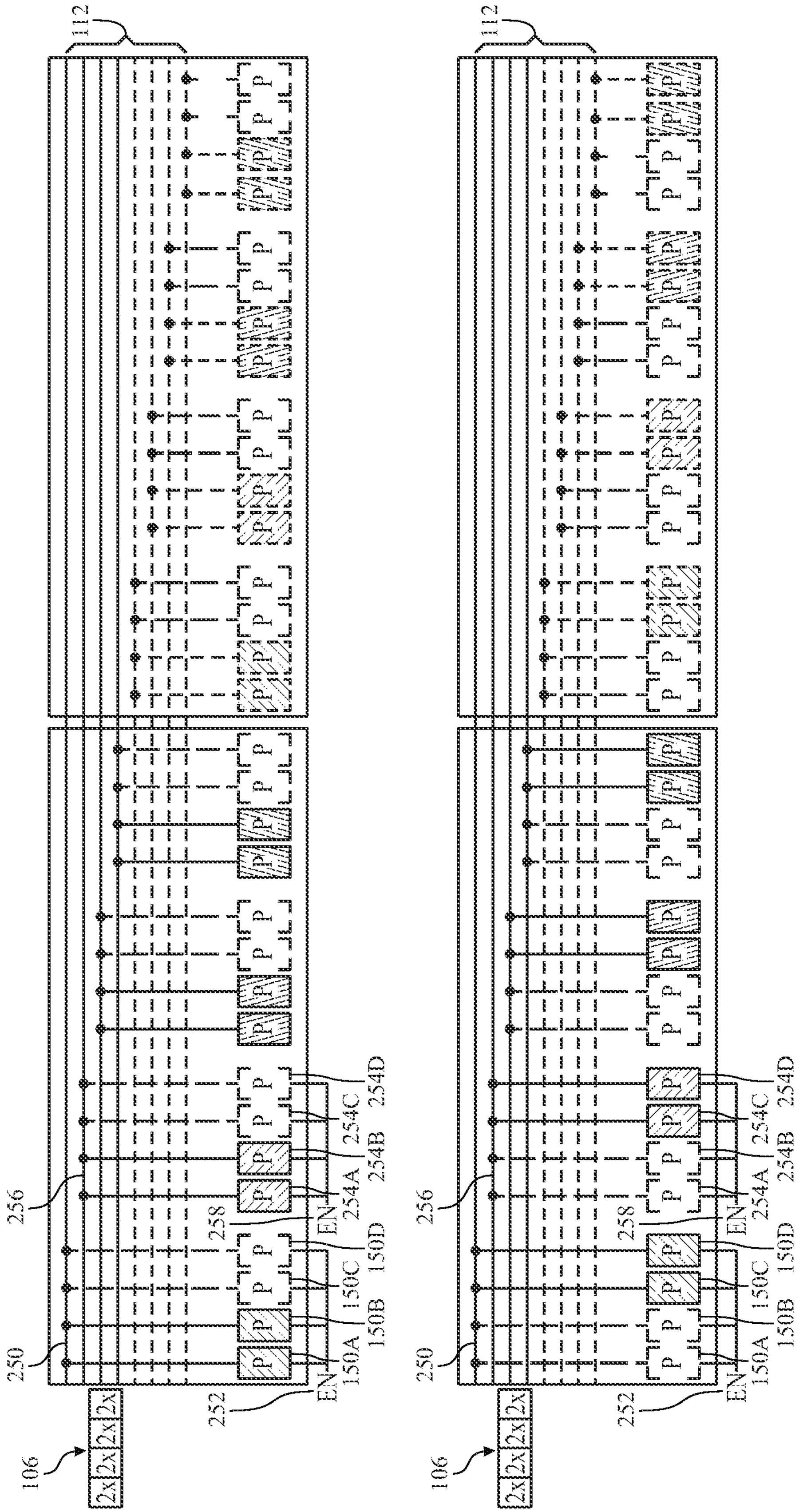
FIG. 15 is an example of passing adjusted foveated image data including 2× pixels to designated registers of the sources latches without using multiplexers, in accordance with an embodiment.

FIG. 15 is an example of passing adjusted foveated image data 106 including 2× pixels to designated registers 150, 254 of the sources latches 110 without using multiplexers, according to an embodiment of the present disclosure. As the adjusted foveated image data 106 includes 2× pixels, the wires 250 and 256 may carry the adjusted foveated image data 106 to two registers at a time for each line. That is, in a first clock cycle, the registers 150A and 150B may receive the adjusted foveated image data 106 via the wire 250 of the data bus 112, while the registers 254A and 254B may receive the foveated image data 106 from the wire 256 of the data bus 112. The registers 150A and 150B may receive the adjusted foveated image data 106 as the enable signal 252 only activates those registers during the first clock cycle, and the registers 254A and 254B may receive the adjusted foveated image data 106 as the enable signal 258 only activates those registers during the first clock cycle.

In a second clock cycle, the enable signal 252 may enable the registers 150C and 150D (and not the registers 150A and 150B) such that the registers 150C and 150D may receive the adjusted foveated image data 106 via the wire 250, and the enable signal 258 may enable the registers 254C and 254D (and not the registers 254A and 254B) such that the registers 254C and 254D receive the adjusted foveated image data via the wire 256. In this manner, 2× foveated image data may be effectively routed to source latches 110 and associated display pixels without the use of multiplexers.

Figure 16:
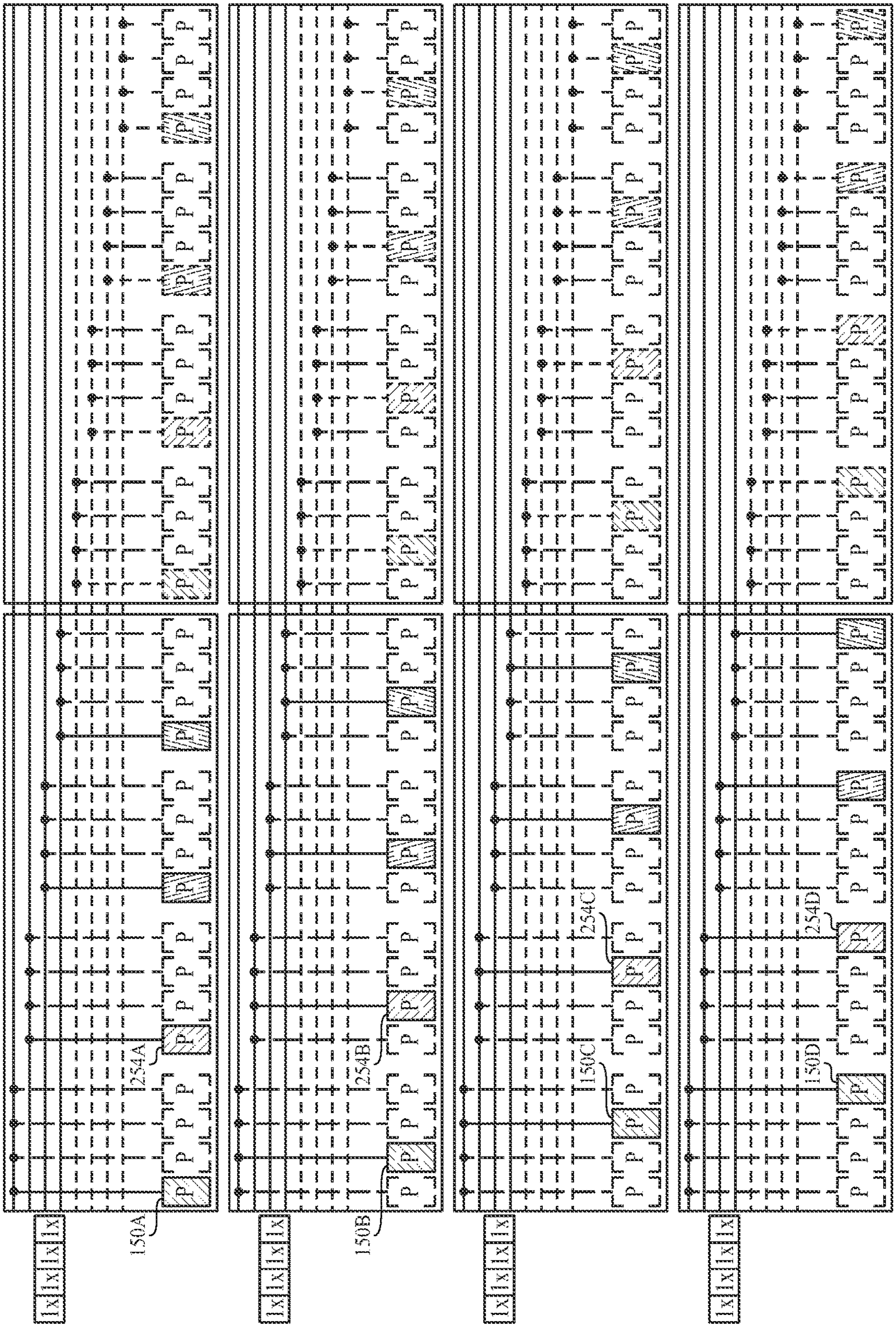
FIG. 16 is an example of passing adjusted foveated image data including 1× pixels to designated registers of the sources latches without using multiplexers, in accordance with an embodiment.

FIG. 16 is an example of passing adjusted foveated image data 106 including 1× pixels to designated registers 150, 254 of the sources latches 110 without using multiplexers, according to an embodiment of the present disclosure. While the enable signals 252 and 258 are not shown for clarity, it should be noted that the registers 150 and 254 are still coupled to control circuitry or a state machine and configured to receive enable signals 252 and/or 258 from the control circuitry or state machine as discussed and illustrated with respect to FIGS. 14 and 15 above.

As the adjusted foveated image data 106 includes 1× pixels, the wires 250 and 256 may carry the adjusted foveated image data 106 to one register 150, 254 per clock cycle. That is, in a first clock cycle, the enable signal 252 may activate the register 150A such that the register 150A may receive the adjusted foveated image data 106 via the wire 250 of the data bus 112, while the enable signal 258 may activate the register 254A such that the register 254A may receive the foveated image data 106 from the wire 256 of the data bus 112. In a second clock cycle, the enable signal 252 may activate the register 150B such that the register 150B may receive the adjusted foveated image data 106 via the wire 250 of the data bus 112, while the enable signal 258 may activate the register 254B such that the register 254B may receive the foveated image data 106 from the wire 256 of the data bus 112.

In a third clock cycle, the enable signal 252 may activate the register 150C such that the register 150C may receive the adjusted foveated image data 106 via the wire 250 of the data bus 112, while the enable signal 258 may activate the register 254C such that the register 254C may receive the foveated image data 106 from the wire 256 of the data bus 112. In a fourth clock cycle, the enable signal 252 may activate the register 150D such that the register 150D may receive the adjusted foveated image data 106 via the wire 250 of the data bus 112, while the enable signal 258 may activate the register 254D such that the register 254D may receive the adjusted foveated image data 106 from the wire 256 of the data bus 112. In this manner, 1× foveated image data may be effectively routed to source latches 110 and associated display pixels without the use of multiplexers.

II. Power Reduction Via Data Bus Gating

As previously mentioned, sending image data across the data bus 112 to the source latches 110 consumes energy, particularly as the number of columns of pixels of the electronic display 12 increases. To reduce the amount of energy consumed by the data bus 112, slices of the data bus 112 may be gated to correspond to which source latches 110 are being loaded. For instance, a first set of source latches 110 corresponding to a first slice of the data bus 112 may be loaded with data while downstream slices of the data bus 112 may be gated to save energy. A token signal passed along the pixel data bus may un-gate the slices over time as image data is passed along to further downstream slices. Thus, fewer slices of the data bus 112 may be active and consuming dynamic power at any point in time.

Figure 17A:
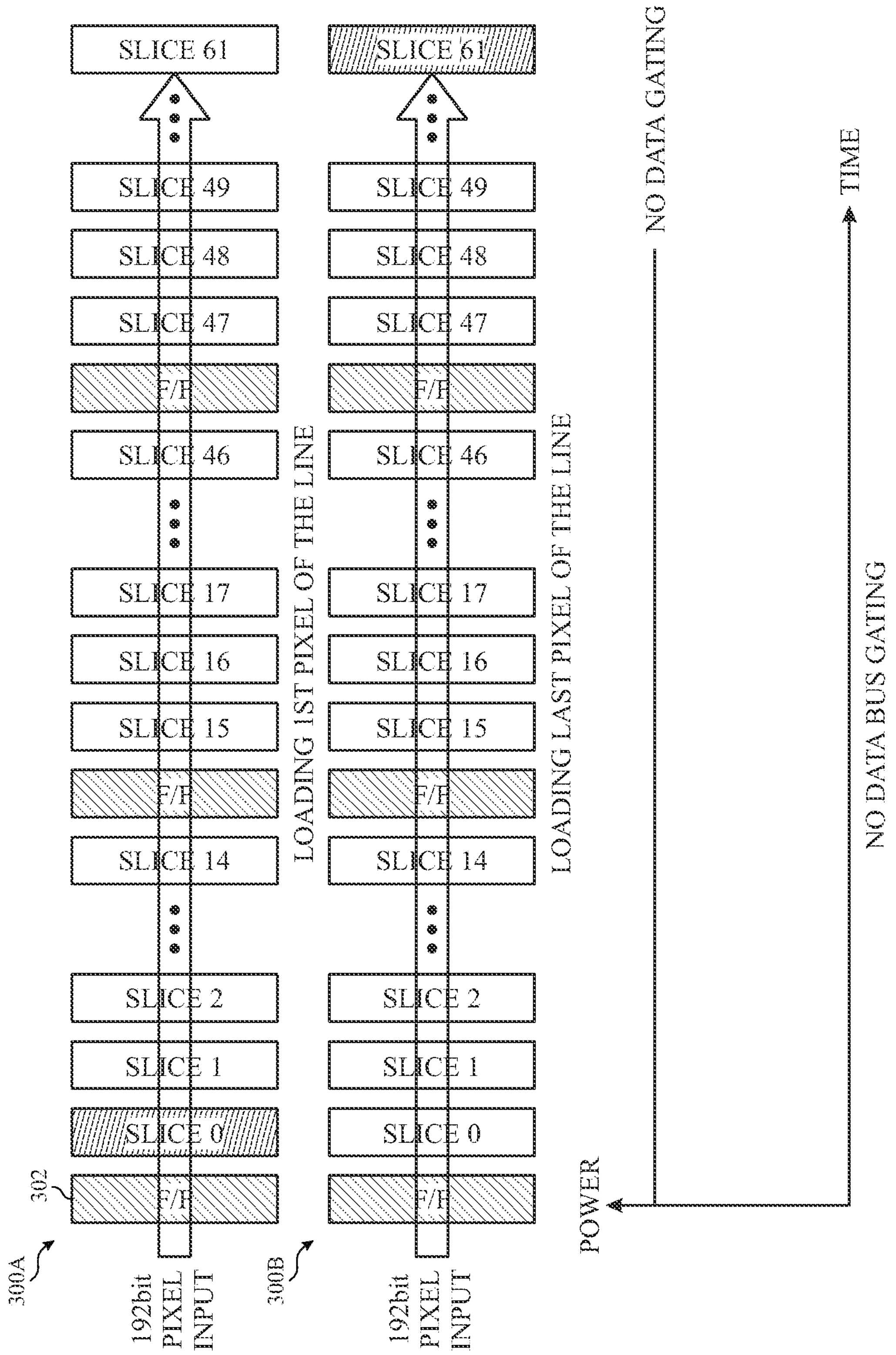
FIG. 17A illustrates a no-gating scheme that may be implemented in some data bus architectures.
Figure 17B:
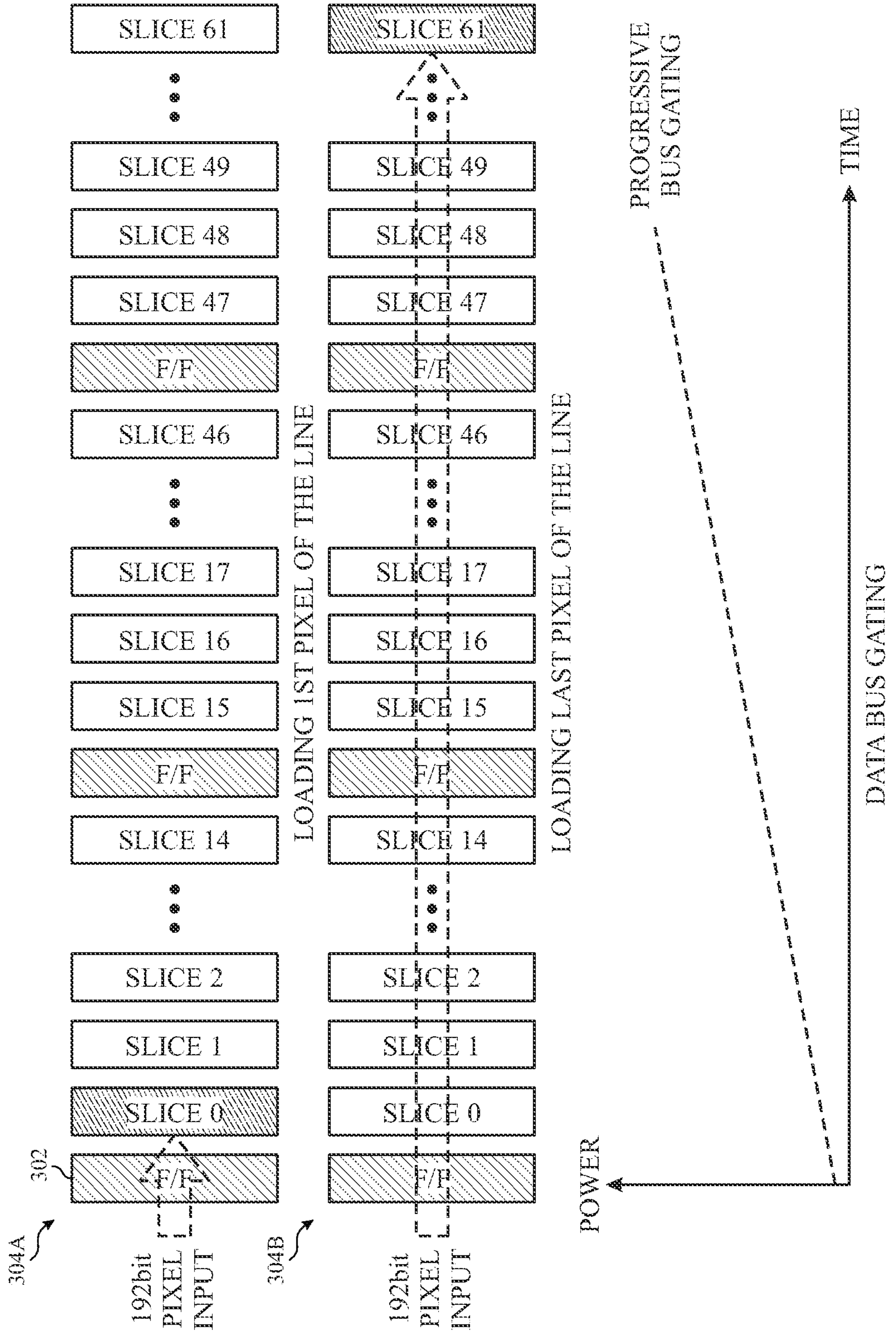
FIG. 17B illustrates a progressive gating scheme that may reduce the overall power consumption of the data bus, in accordance with an embodiment.

With this in mind, FIG. 17A illustrates a no-gating scheme for a data bus architecture wherein all slices of a data bus are initially open and remain open throughout the data transfer, and FIG. 17B illustrates a progressive (e.g., sequential) gating scheme for a data bus architecture that may reduce the overall power consumption of the data bus, according to an embodiment of the present disclosure. FIG. 17A illustrates a data bus 300 that may pass data along in data bus slices 302. The data bus 300 illustrates passing image data (e.g., the adjusted foveated image data 106) in a no-gating scheme at an initial time (e.g., data bus 300A, beginning programming of the first data bus slice 302) and at a final time (e.g., 300B, programming the last data bus slice 302). The data bus 300 initializes by opening (e.g., un-gating) all data bus slices 302 of the data bus 300, and gradually programming slice-by-slice by programming the first data bus slice (Slice 0) with data, which the Slice 0 passes along to Slice 1. Once the data is passed along to the Slice 1, the Slice 0 receives new data. Slice 1 then passes along the initial data to Slice 2, the next data is passed from the Slice 0 to the Slice 1, and the Slice 0 again receives new data. This process continues sequentially until the initial data has reached the final slice (e.g., Slice 61). It should be noted that the data bus 300 may include a number of flip-flops. A flip-flop may be disposed at the beginning of the data bus 300 or 304 or between any two slices 302 of the data bus 300 or 304. While foveated image data is mentioned with respect to FIGS. 17A, 17B, and 18, it should be noted that any image data may be applicable for the discussed gating schemes.

As the data bus 300 initializes by opening all of the data bus slices, the data bus consumes full power from initialization to completion. However, as may be observed from the data bus 304A and 304B (collectively, the data bus 304) of FIG. 17B, power consumption may be reduced by initially gating (e.g., closing) all data bus slices 302 until it is time to pass the programming data to a given slice. For example, a data bus slice 302 (e.g., Slice 0) may be gated until image data (e.g., the adjusted foveated image data 106) is ready to be delivered to the Slice 0, at which point the Slice 0 will be ungated. Thus, all downstream data bus slices 302 (e.g., Slice 1-61) will still be gated and consuming no dynamic power. Once the data is ready to be passed from Slice 0 to Slice 1, Slice 1 will be un-gated, and so on until the final slice (e.g., Slice 61), at which point the data bus 112 may consume maximum power. In this manner, power savings may be realized for the duration of the data transfer within the data bus 112.

Figure 18:
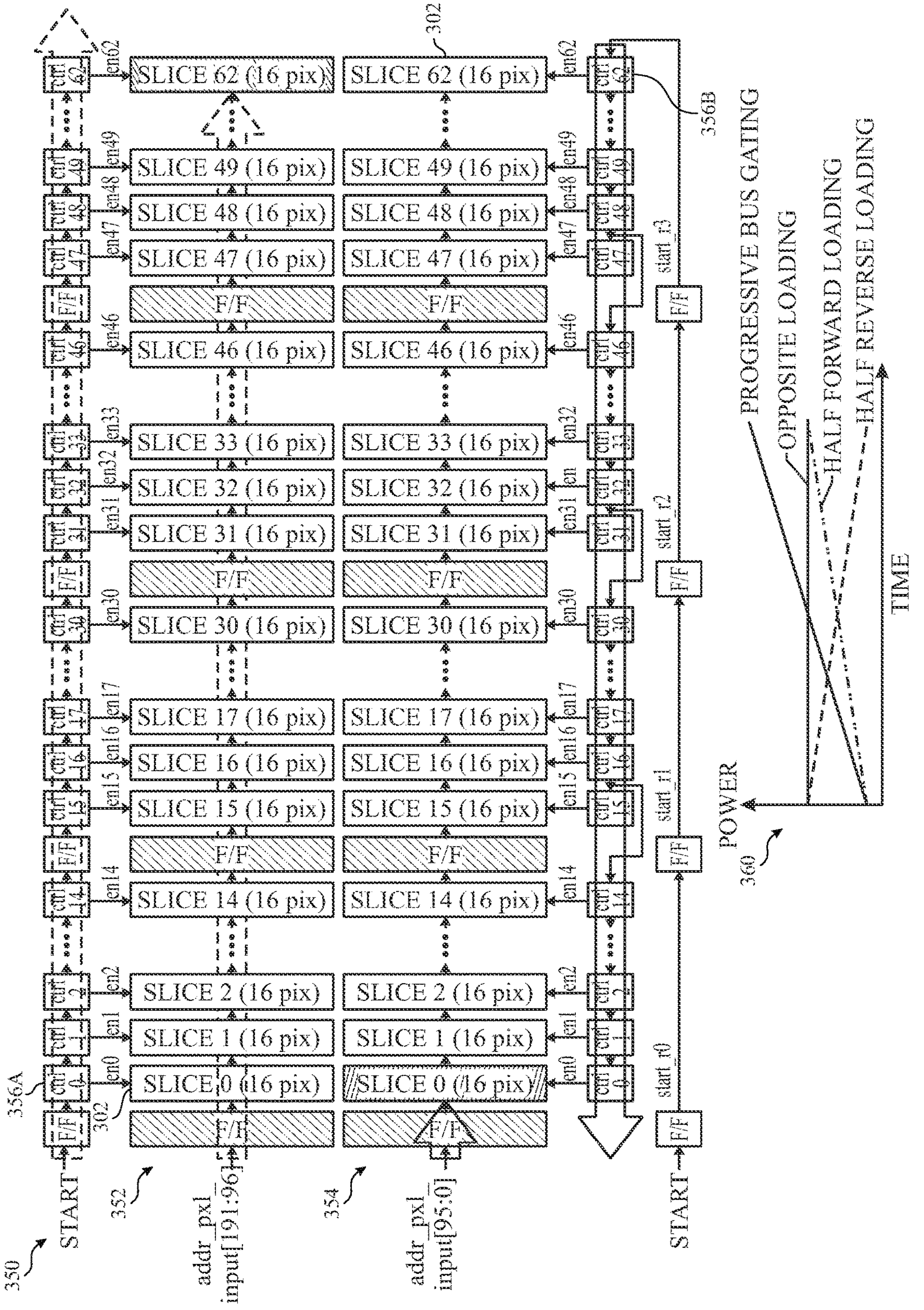
FIG. 18 is an example of the data bus being divided into two parts loaded from opposite sides such that a total number of gated slices may remain stable throughout the loading process, in accordance with an embodiment.

Furthermore to reduce the peak energy consumed by the pixel data bus, the pixel data bus may be divided into two parts that are loaded from opposite sides. FIG. 18 is an example of the data bus 112 being divided into two parts loaded from opposite sides, according to an embodiment of the present disclosure. A data bus 350 may be divided into two portions, a portion 352 and a portion 354. The portion 352 may be progressively ungated (e.g., via control circuitry 356A) as described with respect to the data bus 304 of FIG. 17B. The portion 354 may operate similarly to the data bus 304, however, the portion 354 may be progressively gated (e.g., rather than ungated) from a direction opposite of the ungating (e.g., and programming) of the portion 352. The portion 354 may be gated and/or ungated by the controller circuitry 356B. That is, while the portion 352 initializes with no data bus slices 302 open (e.g., all of the data bus slices 302 may be gated) and sequentially ungate (e.g., open) the data bus slices 302 from Slice 0 to Slice 62. The portion 354 may initialize with all of the data bus slices 302 in the portion 354 open, such that the programming data for each of the data bus slices 302 is present in an appropriate data bus slice 302. For example, beginning with the Slice 62, the data (e.g., the adjusted foveated image data 106) from the Slice 62 may be transmitted to a source latch 110 (as illustrated with respect to FIG. 9), and once the data is transmitted from the data bus 112 to the source latch 110 the Slice 62 may be gated. This will continue sequentially in reverse. Once the Slice 62 is gated, Slice 61 may transmit data to the source latch 110 and then be gated (e.g., by the control circuitry 356B), until the Slice 0 is reached, at which the final remaining adjusted foveated image data 106 may be transmitted to the source latch 110 and the Slice 0 will be gated.

As may be appreciated from the graphs 358 and 360, the peak power consumption of the data bus 304 may be greater than the peak power consumption of the data bus 350 (although the total power consumption may be the same), as the forward loading of the portion 352 and the reverse loading of the portion 354 have opposite peak power consumption. In this manner, the total number of gated slices may remain stable throughout the loading process and the overall power consumption and the peak power consumption of the data bus 112 may be reduced. It should be noted that the data bus 300 may include a number of flip-flops. A flip-flop may be disposed at the beginning of the portion 352 or the portion 354 or between any two slices 302 of the portion 352 or the portion 354.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic display, comprising:
a timing controller configured to output adjusted foveated image data to a data bus, the data bus comprising a plurality of lines; and
a first plurality of source latches directly coupled to a first line of the plurality of lines and configured to receive the adjusted foveated image data via a data pathway without a multiplexer between the timing controller and the source latches.

2. The electronic display of claim 1, comprising a second plurality of source latches directly coupled to a second line of the plurality of lines.

3. The electronic display of claim 2, comprising control circuitry configured to selectively enable different source latches of the first plurality of source latches to receive first foveated image data via the first line to provide the first foveated image data to the different source latches.

4. The electronic display of claim 3, the control circuitry configured to selectively enable the second plurality of source latches to receive second foveated image data via the second line.

5. The electronic display of claim 4, wherein the first foveated image data and the second foveated image data comprise pixels having the same foveation ratio.

6. The electronic display of claim 1, comprising:
a plurality of pixels in a pixel array; and
the timing controller configured to:
receive foveated image data;
determine first foveated image data of the foveated image data comprising a first foveated data format and second foveated image data of the foveated image data comprising a second foveated data format are present in a portion of the electronic display;
convert the foveated image data from the first foveated data format to the second foveated data format to generate adjusted foveated image data such that the adjusted foveated image data within the portion of the electronic display comprises the second foveated data format; and
provide the adjusted foveated image data to the pixel array.

7. The electronic display of claim 6, wherein the first foveated image data in the first foveated data format comprises a first foveated pixel at a first foveation resolution and the adjusted foveated image data in the second foveated data format comprises the first foveated pixel at a second foveation resolution different than the first foveation resolution.

8. The electronic display of claim 7, wherein the first foveation resolution and the second foveation resolution correspond to respective multiplexing periods involved in providing the adjusted foveated image data to the pixel array.

9. The electronic display of claim 6, wherein the timing controller is configured to receive the foveated image data in slices comprising a plurality of foveated pixels.

10. The electronic display of claim 6, wherein the pixel array comprises the plurality of pixels coupled to respective source latches of the first plurality of source latches.

11. The electronic display of claim 6, wherein the timing controller is configured to provide the adjusted foveated image data to the pixel array via the data bus, the data bus comprising a first portion configured to sequentially load data through a first plurality of data bus slices in a first direction.

12. The electronic display of claim 11, the data bus comprising a second portion configured to sequentially load data through a second plurality of data bus slices in a second direction.

13. Source latch circuitry, comprising:
a first register coupled directly to a first data bus line and configured to receive first foveated image data via a first multiplexer-free data pathway between a timing controller and the first register; and
a second register coupled directly to a second data bus line and configured to receive second foveated image data via a second multiplexer-free data pathway between the timing controller and the second register.

14. The source latch circuitry of claim 13, comprising control circuitry configured to selectively enable the first register to receive the first foveated image data via the first data bus line.

15. The source latch circuitry of claim 13, comprising control circuitry configured to selectively enable the second register to receive the second foveated image data via the second data bus line.

16. The source latch circuitry of claim 13, wherein the first register is configured to provide the first foveated image data to one or more pixels of a pixel array.

17. The source latch circuitry of claim 13, wherein the second register is configured to provide the second foveated image data to one or more pixels of a pixel array.

18. A device, comprising:

a first plurality of source latches directly coupled to a first line of a data bus; and control circuitry configured to selectively enable different source latches of the first plurality of source latches to receive first foveated image data via the first line to provide the first foveated image data to the different source latches, wherein the first foveated image data is received by the different source latches via a data pathway without a multiplexer between a timing controller and the different source latches.

19. The device of claim 18, comprising a second plurality of source latches directly coupled to a second line of the data bus, wherein the control circuitry is configured to selectively enable the second plurality of source latches to receive second foveated image data via the second line.

20. The device of claim 19, wherein the first foveated image data and the second foveated image data comprise pixels having the same foveation ratio.

* * * * *